US012772986B2

United States Patent
(12) United States Patent
Das et al.

(10) Patent No.: US 12,772,986 B2
(45) Date of Patent: Oct. 27, 2026

(54) LOW FAT HIGH HEAT STABLE NON-DIARY WHIPPING CREAM

(71) Applicant: Rich Products Corporation, Buffalo, NY (US)

(72) Inventors: Atanu Das, Bhosari (IN); Prabhakar Dasud, Bhosari (IN); Shashi Mishra, Bhosari (IN); Shri K Sharma, Buffalo, NY (US)

(73) Assignee: Rich Products Corporation, Buffalo, NY (US)

( * ) Notice: Subject to any disclaimer, the term of this patent is extended or adjusted under 35 U.S.C. 154(b) by 572 days.

(21) Appl. No.: 18/029,773

(22) PCT Filed: Sep. 30, 2021

(86) PCT No.: PCT/IB2021/059012
§ 371 (c)(1),
(2) Date: Mar. 31, 2023

(87) PCT Pub. No.: WO2022/070138
PCT Pub. Date: Apr. 7, 2022

(65) Prior Publication Data
US 2023/0363404 A1 Nov. 16, 2023

(30) Foreign Application Priority Data
Oct. 1, 2020 (IN) ............................. 202011042684

(51) Int. Cl.
*A23C 13/12* (2006.01)
*A23L 9/20* (2016.01)

(52) U.S. Cl.
CPC ................ *A23C 13/12* (2013.01); *A23L 9/24* (2016.08); *A23C 2210/30* (2013.01)

(58) Field of Classification Search
CPC ........ A23D 13/12; A23D 2210/30; A23L 9/24
See application file for complete search history.

(56) References Cited

U.S. PATENT DOCUMENTS 10,645,967 B2 5/2020 Mishra et al.
2007/0071874 A1* 3/2007 Cash ..................... A23C 13/12 426/601

(Continued)

FOREIGN PATENT DOCUMENTS

CN 104955338 A 9/2015
CN 111479469 A 7/2020

(Continued)

OTHER PUBLICATIONS

European Patent Office Extended Search Report for Application No. 21874706 dated Sep. 4, 2024 (10 pages).

(Continued)

*Primary Examiner* — Erik Kashnikow
*Assistant Examiner* — Assaf Zilbering
(74) *Attorney, Agent, or Firm* — Michael Best & Friedrich LLP

(57) ABSTRACT

The present invention is providing a whipping cream composition comprising combination of fats, protein, sweetener, stabilizer, emulsifier and water. The whipping cream composition is a low-fat, non-dairy whipping cream composition that is stable at high temperature. The whipping cream composition having increased heat stability such as rosette stability, bench stability, high overrun, and no cracking on finished cakes at high temperature.

22 Claims, 1 Drawing Sheet

(56) References Cited

U.S. PATENT DOCUMENTS

| | | | |
|---|---|---|---|
| 2011/0039008 | A1 | 2/2011 | Oonishi et al. |
| 2015/0237899 | A1 | 8/2015 | Cao et al. |
| 2019/0116852 | A1 | 4/2019 | Kinkelaar et al. |

FOREIGN PATENT DOCUMENTS

| | | | | |
|---|---|---|---|---|
| IE | 20060648 | A2 | | 12/2007 |
| IN | 1930DE2012 | A | * | 12/2015 |
| WO | 0141586 | A1 | | 6/2001 |
| WO | 2004103088 | A2 | | 12/2004 |
| WO | 2008030173 | A1 | | 3/2008 |
| WO | 2009023560 | A1 | | 2/2009 |
| WO | 2019123284 | A1 | | 6/2019 |

OTHER PUBLICATIONS

"Shamsi K et al: ""A comparative study of dairy whipping cream and palm oil-based whipping cream in terms of FA composition and foam stability"", Journal of the American Oil Chemists Society, Springer, DE, vol. 79, No. 6, Jan. 1, 2002 (Jan. 1, 2002), pp. 583-588, XP002421502, ISSN: 0003-021 X, DOI: 10.1007/S11746-002-0526-2 (6 pages)."

International Search Report and Written Opinion for Application No. PCT/IB2021059012 dated Jan. 18, 2022 (9 pages).

International Preliminary Report on Patentability for Application No. PCT/IB2021059012 dated Mar. 28, 2023 (7 pages).

Ribeiro, Apb, et al. "Crystallization modifiers in lipid systems." Journal of food science and technology 52 (2015): 3925-3946.

Chinese Patent Office First Action for Application No. 202180075032.6 dated Feb. 28, 2025 (40 pages including English machine translation).

Ribeiro et al., "Crystallization modifiers in lipid systems", J Food Sci Technol (Jul. 2015) 52(7):3925-3946 (22 pages).

Indonesian Patent Office Action for Application No. P00202303458 dated Sep. 1, 2025 (5 pages including English translation).

Chinese Patent Office Action for Application No. 202180075032.6 dated Oct. 1, 2025 (31 pages including English machine translation).

Xie Jizhi et al., "Science and Technology of Liquid Dairy Products", No. 120 Page, China Light Industry Press dated 1999 (4 pages including English Statement of Relevance).

Korean Patent Office Action for Application No. 1020237011206 dated Apr. 23, 2026 (10 pages including English machine translation).

India Intellectual Property Office Examination Report for Application No. 202011042684 dated Aug. 4, 2026 (8 pages).

* cited by examiner

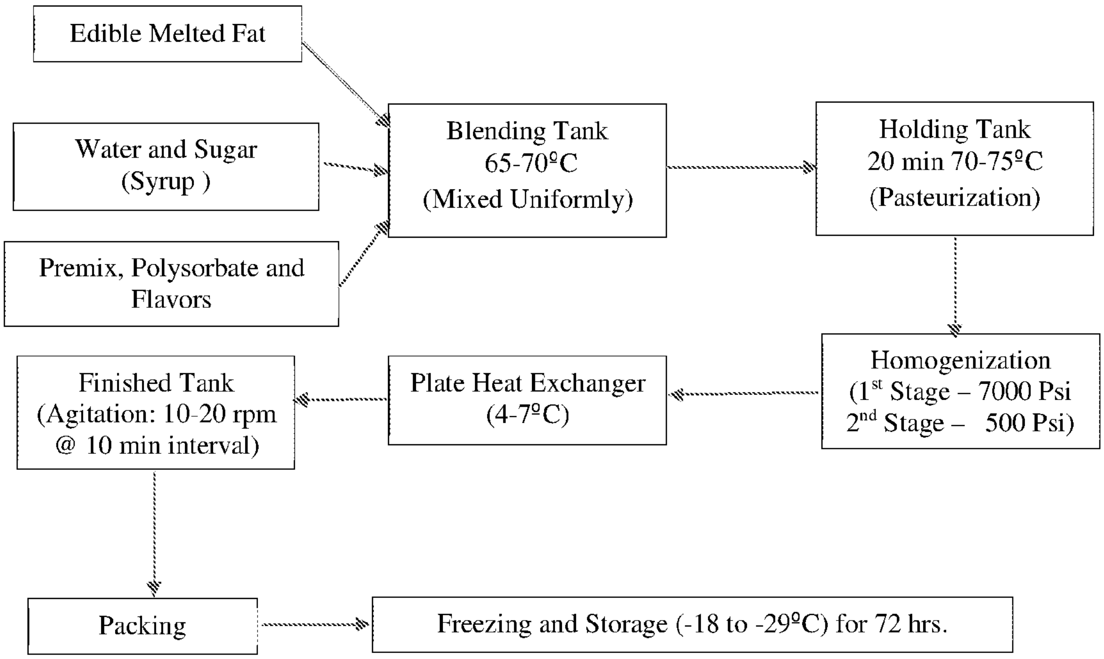
Edible Melted Fat
Water and Sugar (Syrup )
Premix, Polysorbate and Flavors
Blending Tank 65-70ºC (Mixed Uniformly)
Holding Tank 20 min 70-75ºC (Pasteurization)
Homogenization (1st Stage – 7000 Psi 2nd Stage – 500 Psi)
Plate Heat Exchanger (4-7ºC)
Finished Tank (Agitation: 10-20 rpm @ 10 min interval)
Packing
Freezing and Storage (-18 to -29ºC) for 72 hrs.

LOW FAT HIGH HEAT STABLE NON-DIARY WHIPPING CREAM

RELATED APPLICATION

This application claims the benefit of Indian provisional application number 202011042684, filed on Oct. 1, 2020; the contents of which are hereby incorporated by reference in their entirety.

FIELD OF INVENTION

The present invention relates generally to the field of whippable food products and more particularly to a whippable food product having improved performance, low fat, stability at high temperature, rosette stability, reduced cracking and/or bench stability.

BACKGROUND OF THE INVENTION

Whipping creams are generally used in various forms as a topping or filling material for confectionery and bakery products. However, such whipping creams, in many instances have high fat content (e.g., 15%-40% fat), are required to be frozen and are unstable at high temperatures. For example, the creams have poor rosette stability (e.g., less than 45 minutes when at refrigerated temperatures), poor bench stability when in a bowl, low overrun, and exhibit cracking on finished cakes. Further, most whipping creams lack desired texture, taste, mouthfeel, shelf life, and/or freeze thaw stability Generally, to formulate a whipping cream with good whipping ability 20-40% fat is used, which gives it easy to whip, good foam strength and higher overrun. After whipping the location of fat globules, protein network and position of air cells are very important to stabilize the final product. The interfacial change occurs during whipping or aeration process leads to initially stabilize the emulsion and then destabilize the whole system, to make it suitable for application. There are three different stages of whipping brings a robust change in cream appearance according to a microstructural study. At first stage of whipping in medium speed large air bubbles are introduced and then their sudden rapid increase in overrun occurs due to formation of foam, foams are later stabilized by protein molecules. Then at the second stage (High speed), air bubbles are dispersed and decreased in diameter, so extent of fat globule agglomeration increases. Finally at the third stage (Medium speed) a thin protein membrane like network on the surface of air bubbles got penetrated by fat globules and fat crystals settles in the plane of air-plasma interface. Partially agglomerated fat globule gives stiffness to the whipped cream structure.

A stable whipped cream generally has different stability time at different temperature range. The standard stability time may range from 30-60 minutes, in between this time frame application must be done and also after that few creams are also reusable by whipping with little liquid whipping cream. After this particular time frame different creams shows different kind of instability issue. Few creams turn into a coarse textured cream, that may be hard coarse or soft coarse or simply soft. As discussed before fat crystals situates in between air and plasma cells, so after the specific stability time fat crystals melts and air cells are exposed that drives the cream towards coarse texture.

Another stability measure in cream use to observe through rosette time by filling whipped cream in piping bags and rosettes are made in 5 minutes interval. Inside the piping bags the stability of cream reduced due to the increase in temperature by far faster manner Which shows turning the cream into coarse rosette and that also depends upon the room temperature of the experiment.

Therefore, it is very difficult for bakers those who do not have any air-cooling system in their application space. When after and during whipping, cream exposed to high heat of baking oven; creams use to get spoiled very early even prior to application.

U.S. Publication No. 2019/0116852 is directed to a non-dairy plant-based culinary cream comprising 30-88 wt. % water, 3-40 wt. % fat, 0.01-14 wt. % stabilizer, and 1-20 wt. % dairy-free milk and/or dairy-free milk powder. The composition may further comprise up to 5 wt. % soy protein, vegetable fat such as palm kernel oil, up to 5 wt. % propylene glycol monostearate, monoglycerides and/or diglycerides. The '852 publication specifically states that the composition is unstable when whipped.

U.S. Pat. No. 10,645,967 is directed to an acidified aerated whipped composition comprising a high fraction of oil (an oil/water emulsion) that exhibits microbial stability and stability with respect to "whipped" texture without requiring refrigeration. Specifically, the composition comprises 0.2-5% isolated whey or modified soy protein, 0.2-5% stabilizer (when the protein is soy the stabilizer is cyclodextrin and when the protein is whey the stabilizer comprises an ester of mono/di glyceride fatty acids), at least 30% non-esterified triglyceride oil such as palm oil, a hydrocolloid, water, and a food grade acid, wherein the composition has a pH of less than 4.

Thus, there is a need for whipped cream that alleviates one or more problems described above.

SUMMARY OF THE INVENTION

Accordingly, an aspect of the present invention is providing a whipping cream composition comprising combination of fats, protein, sweetener, stabilizer, emulsifier and water. The whipping cream composition provided herein alleviates one or more problems of prior art.

In another aspect, provided herein is a low-fat, non-dairy whipping cream composition that is stable at high temperature.

In yet another aspect, provided herein is a low-fat, non-dairy whipping cream composition having increased heat stability such as rosette stability, bench stability, high overrun, and no cracking on finished cakes at high temperature.

BRIEF DESCRIPTION OF THE FIGURES

FIG. 1 illustrates a non-limiting process for manufacturing the edible topping composition of the present invention.

DETAILED DESCRIPTION OF INVENTION

It is to be understood that the present disclosure is not limited in its application to the details of composition set forth in the following description. The present disclosure is capable of other embodiments and of being practiced or of being carried out in various ways. Also, it is to be understood that the phraseology and terminology used herein is for the purpose of description and should not be regarded as limiting.

The use of "including", "comprising" or "having" and variations thereof herein is meant to encompass the items listed thereafter and equivalents thereof as well as additional items.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention.

For convenience, certain terms used in the specification, examples, and appended claims are collected in this section.

As used herein, the term 'compound(s)' comprises the compounds disclosed in the present invention.

Each embodiment is provided by way of explanation of the invention and not by way of limitation of the invention. In fact, it will be apparent to those skilled in the art that various modifications and variations can be made to the compounds, compositions and methods described herein without departing from the scope or spirit of the invention. For instance, features illustrated or described as part of one embodiment can be applied to another embodiment to yield a still further embodiment. Thus, it is intended that the present invention includes such modifications and variations and their equivalents. Other objects, features, and aspects of the present invention are disclosed in or are obvious from, the following detailed description. It is to be understood by one of ordinary skill in the art that the present discussion is a description of exemplary embodiments only and is not to be construed as limiting the broader aspects of the present invention.

In an embodiment, the present disclosure provides a whipping cream composition comprising (i) combination of fats, (ii) protein, (iii) sweetener, (iV) stabilizer, (v) emulsifier and (vi) water.

In certain embodiments, fat that is used in the present composition provides high melting point, higher solid fat content, uniform crystal distribution and/or good sensorial mouthfeel. Any fat which provides desired high melting point, higher solid fat content, uniform crystal distribution and/or good sensorial mouthfeel fat can be used in the present composition. In certain embodiments, the composition of the present disclosure comprises two different kinds of fats, fat 1 and fat 2. In certain embodiments, both fat 1 and fat 2 are vegetable fats derived from palm kernel oil with higher lauric fat and hydrogenated in a different degree. In further embodiments, fat 1 and fat 2 are fully hydrogenated or partially hydrogenated. In some instances, fat 1 is fully hydrogenated palm kernel oil and fat 2 is partially or fully hydrogenated palm kernel oil. In further instances, both fat 1 and fat 2 are fully hydrogenated. In certain embodiments, fat 1 and fat 2 are present in an amount from about 30 wt % to about 50 wt %, and from about 50 wt % to about 70 wt %, respectively. In some instances, fat 1 and fat 2 are added in a combination of about 2.5% and about 6% respectively. In certain embodiments, fat 1 and fat 2 have about 53% and about 46% lauric acid, about 22% and about 16% myristic acid respectively and both have an iodine value of less than 2. In certain embodiments, the combination of fat 1 and fat 2 provides higher slip melting point and lower iodine value and in both cases crystalized into a most stable mixture of β' and pseudo β' structure. In certain embodiments, fat 1 comprises 22% of stearic acid so that in combination product exhibits a very desirable mouthfeel. In certain embodiments, fat 1 and fat 2 both exhibit a higher amount of solid fat content (SFC). In further embodiments, fatty acid profile of fat 1 comprises 3 to 4% C:10; 46 to 48% C:12; 14 to 16% C:14; 8 to 9% C:16; 22 to 23% C:18; 0.3 to 0.5% C:18:1; and 0.1 to 0.3% C:18:2. 4. In some embodiments, fatty acid profile of fat 2 comprises 2 to 4% C:10; 49 to 53% C:12; 21 to 23% C:14; 9 to 11% C:16; 7 to 9% C:18; 0.3 to 1% C:18:1; and 0.2 to 0.5% C:18:2. In certain embodiments, SFC of fat 1 is 75 to 80% at 20° C.; 55 to 60% at 25° C.; 28 to 30% at 30° C.; and 6 to 8% at 40° C. In further embodiments, SFC of fat 2 is 93 to 97% at 20° C.; 85 to 90% at 25° C.; 42 to 50% at 30° C.; and 0 to 0.5% at 40° C. In some instances, the fatty acid profile and SFC of fat 1 and fat 2 are as shown in table 1 and 2 below.

TABLE 1

| Fatty Acid Profile of Fat 1 and Fat 2 Fatty acids | % of the total fatty acid Fat 1 | Fat 2 |
|---|---|---|
| C:10 | 3.25 | 3 |
| C:12 | 46 | 53 |
| C:14 | 16 | 21.5 |
| C:16 | 8.75 | 9 |
| C:18 | 22.5 | 9 |
| C:18:1 | 0.5 | 1 |
| C:18:2 | 0.3 | 0.5 |

TABLE 2

SFC of Fat 1 and Fat 2

| | SFC (%) | |
|---|---|---|
| T (° C.) | Fat 1 (MP: 40° C.) | Fat 2 (MP: 34.5° C.) |
| 20 | 80 | 97 |
| 25 | 60 | 90 |
| 30 | 30 | 50 |
| 35 | 18 | 5 |
| 40 | 8 | 0 |

Protein is another important ingredient used in the present composition. Protein is used to provide stability to the product and form a layer to stabilize the foam during the first phase of whipping. In certain embodiments, two or more different source of proteins are used in the present composition. In some instances, two different sources of proteins are used in the present composition. In further instances, three different sources of proteins are used in the present composition. In certain embodiments, the protein used in the present composition is a combination of micellar and globular proteins. In certain embodiments, micellar protein is micellar casein. In certain embodiments, any micellar casein such as alkali metal caseinates, particularly sodium caseinate and/or potassium caseinate can be used in the present invention. In some instances, sodium caseinate is used in the present invention. Sodium caseinate majorly consists of αs-casein (micellar) which gives a stable gel like soy protein isolate. In certain embodiments, globular protein is selected from the group comprising milk derived protein, plant protein, beta-lactoglobulin, ovalbumine, bovine serum albumin, and any combination thereof. In further embodiments, the globular protein is selected from the group comprising soy protein, whey protein, pea protein, butter milk powder and any combination thereof. In further instances, combination of alkali metal caseinate, soya protein isolate, and butter milk powder is used as protein in the present invention. In some instances, combination of alkali metal caseinate (such as sodium caseinate and potassium caseinate), and butter milk powder is used as protein in the present composition. Soy protein isolates majorly have globular proteins which are soluble in water only in absence of salts. That is why another micellar protein (K-casein) which is also having fat globular protein like phospholipids, lecithin may also be used in the present composition. Majorly acts as an emulsifier and forms a high heat stable film of protein due to having —SH group, builds a rigid protein structure altogether to stabilize the emulsion. In certain embodiments, the whipping cream composition comprises protein in an amount from about 0.45 wt % to about 0.6 wt % such as about 0.5-0.6 wt % and about 0.55% to 0.6 wt %. In certain embodiments, plant protein is present in an amount from about 0.05 wt. % to about 0.20 wt. %. In certain embodiments, milk protein is present in an amount from about 0.40 wt. %. to about 0.50 wt. %. In some instances, buttermilk powder is present in amount from about 0.02 wt % to about 0.40 wt. %.

In certain embodiments, the sweetener used in the whipping cream composition of the present invention is selected from the group comprising monosaccharides, disaccharides, polysaccharides. In further embodiments, the sweetener may comprise one or more sugars such as sucrose, glucose, fructose, isomaltulose, trehalulose, allulose (D-psicose), sugar syrups (e.g., corn syrup, high-fructose corn syrup, rice syrup, glucose syrup, honey etc.); artificial sweeteners such as sugar alcohols or polyols (e.g., mannitol, sorbitol, xylitol, etc.) aspartame, sucralose, etc. In some embodiments, any sweetener suitable for whipping cream may be used in the composition of the present invention. The sweetener may be granule sweetener, powder sweetener, crystal sweetener or syrup sweetener or any combination thereof. In certain embodiments, the sweetener is present in an amount from about 25 wt. %. to about 30 wt. % including 26 wt. %, 27 wt. %, 28 wt. %, 29 wt. %, 30 wt. %.

In certain embodiments, the stabiliser used in the whipping cream composition of the present invention is selected from the group comprising hydrocolloids such as hydroxypropyl methylcellulose (HPMC), xanthan gum, tara gum, locust bean gum and any combination thereof. In further embodiments, the whipping cream composition of the present invention comprises the stabiliser in an amount from about 0.30 wt. % to about 0.50 wt. % including about 0.35-0.5 wt. %, about 0.4-0.5 wt. %, about 0.45-0.5 wt. %, 0.3-0.4 wt. % or 0.34-0.4 wt. %. In certain embodiments, combination of HPMC, tara gum and xanthan gum is used in the present composition. Hydroxypropyl methylcellulose (HPMC) with higher hydroxypropylation used to reduce the particle size of the emulsion under high shear which gives a proper distribution of crystals. During whipping HPMC also shows positive effect on partial coalescence of fat globules and also reduce the surface activity of protein and increase the overrun. When surface activity of proteins reduced then protein-polysaccharide interaction occurs and gives strength to whipped cream. Thus, selection of hydrocolloids is very important in this composition which not only gives strength to the cream also contributes towards the heat stability of the product. In some instances, tara gum which is comprised with galactose and mannose with a ratio of 1:3 is used in the whipping cream composition of the present invention. Tara gum is a very high molecular weight hydrocolloid comprised with 70% soluble fiber and 10% insoluble fiber. Tara gum controls ice crystal growth, gives a texture to the product, improves mouthfeel and more importantly controls the meltdown of crystals. Tara gum also provides an outstanding heat shock protection to the emulsion. Xanthan gum is an identical match of tara gum due to synergistic interaction with galactomannans. Xanthan gum, in the presence of salts such as phosphate salts, stabilizes the conformational changes in protein structure. Thus, in certain embodiments, the whipping cream composition of the present invention further comprises a salt. In certain embodiments, the salt is selected from the group comprising phosphate salt, halide salt, citrate salt and any combination thereof. In further embodiments, the salt is a phosphate salt.

In some instances, the phosphate salt is an alkaline phosphate salt such as disodium orthophosphate, dipotassium orthophosphate sodium tripolyphosphate and tetrasodium pyrophosphate. In further instances, the alkaline phosphate salt is disodium orthophosphate. In certain embodiments, the salt may present in an amount from about 0.01 wt. %. to about 0.10 wt. % such as about 0.01 wt. %. to about 0.5 wt. % including about 0.01-0.4 wt. %, about 0.01-0.3 wt. %, about 0.01-0.2 wt. %, and about 0.01-0.1 wt. %.

The whipping cream composition of the present invention comprises an emulsifier in an amount from about 0.5 wt. % to about 1.5 wt. % such as about 0.5-1.0 wt. % including about 0.6-1.0 wt. % such as about 0.55 wt. %, about 0.65 wt. % about 0.75 wt. %, about 0.85 wt. %, and about 0.95 wt. %. In certain embodiments, a combination of stabilizing and destabilizing emulsifiers is used to stabilize the emulsion and also the whipped cream. In certain embodiments, the emulsifier is selected from the group comprising polyglycol ester, propylene glycol mono stearate, mono glyceride, sorbitan mono stearate, polysorbate 60 or 80 and any combination thereof. In further embodiments, the emulsifier is a combination of polyglycol ester (PGE), propylene glycol mono stearate (PGMS), mono glyceride (MG), sorbitan mono stearate (SMS) and polysorbate 80.

Polyglycerol ester of fatty acids is used as a stabilizing emulsifier which acts as an interface between hydrophilic and lipophilic phases and stabilize the emulsion, a best stabilizing agent to short chain lauric fat fractions. PGMS also used as a stabilizing emulsifier, which stabilizes the foam after whipping and more often used with PGE in several whipping cream formulations.

In certain embodiments, combination of is used in this formulation which comprised with distilled mono glyceride (DMG) and SMS is used as a destabilizing emulsifier. DMG competes with proteins majorly milk proteins, at the fat/water interface and at the air water interface. The air/water interface is stabilized with denatured milk protein, partially destabilized fat and agglomerated fat globules. DMG is responsible for partial destabilization of fat globules.

SMS also helps in partial agglomeration of fat globules by narrowing down the particle size of the emulsion. It reduces the interfacial tension of the whipped cream which contributes to the visco-elastic property of protein film. Polysorbate 80 contributes towards the higher overrun and also increases the whipping time of the product, also hinders the oil separation, and thickens the emulsion.

In certain embodiments, the whipping cream composition of the present invention comprises water in an amount from about 50 wt. % to about 70 wt. % such as about 55-70 wt. %, about 55-65 wt. %, about 50-65 wt. %, and about 55-65 wt. %.

In certain embodiments, the whipping cream composition of the present invention further comprises a crystallizer, a flavoring agent, colouring agents, preservatives, or any combination thereof. In certain embodiments, the crystallizer may present in an amount from about 0.03 wt % to about 0.05 wt % including about 0.035 wt %, about 0.04 wt % and about 0.045 wt %. Any flavoring agent such as such as vanilla (e.g., EuroVanillin), chocolate flavoring, mint flavoring, milk flavoring, butter flavoring, coffee flavoring, caramel flavoring, spice flavoring, and fruit flavoring may be used in the present invention. In certain embodiments, the flavouring agents may be natural, artificial, or a mixture thereof.

In certain embodiments, the whipping cream composition of the present invention comprises:

combination of fats, fat 1 and fat 2, having different fatty acid profile and solid fat content (SFC), wherein fat 1 and fat 2 are present in an amount from about 30 wt % to about 50 wt %, and from about 50 wt % to about 70 wt %, respectively;

combination of micellar and globular proteins in an amount from about 0.45 wt % to about 0.6 wt % sweetener in amount from about 25 wt. %. to about 30 wt. %;

stabilizer in an amount from about 0.30 wt. % to about 0.50 wt. %;

emulsifier in an amount from about 0.5 wt % to about 1.5 wt %; and water in an amount from about 50 wt % to about 70 wt %;

wherein fat 1, fat 2, micellar protein, globular protein, sweetener, stabilizer and emulsifier are same as defined above.

In certain embodiments, the whipping cream composition of the present invention is a low-fat, non-dairy whipping cream and is stable at high temperature. In certain embodiments, the whipping cream composition of the present invention provides increased heat stability such as rosette stability, bench stability, high overrun (e.g., 400-420%), and/or no cracking on finished cakes at high temperature. For example, in some instances, the whipping cream composition at unwhipped state the edible topping is liquid at refrigeration and ambient condition. The liquid is free flowable and easily pourable at ambient temperature. The edible topping at an unwhipped state can be stored frozen for a year and at refrigerated condition can be stored for 9 months when unopened. The edible topping at whipped state is stable at refrigerated condition typically for 48 to 72 hours. In a whipped state has a non-greasy texture and after tasting has a clean palate with rich mouthfeel and having an overrun of 400-420%.

In certain embodiments, the present invention provides a method of preparing whipping cream composition of the present invention. The process steps of the method are conventional in nature. FIG. 1 illustrates a non-limiting process for forming the edible topping composition of the present invention. As shown in FIG. 1, the partially or fully hydrogenated oil (e.g., edible fat), water, sweetener, emulsifier, stabilizer, salt, optional flavoring and coloring or may be other optional ingredient are placed in a blending tank and mixed until altogether mixed uniformly, there should not be any significant lump formation during mixing.

The milk proteins which are used in the premix mixture are added at a range of about 55-65° C. and then with all the ingredients, the mixture is heated upto 75° C. The pasteurization generally occurs at a temperature of about 72-75° C. After pasteurization, the blend is homogenized using two stage pressure off 7000 psi and 500 psi respectively. After homogenization, the emulsion is cooled down to about 4-7° C. Then packed into gable top pouches and transferred to frozen storages (−20 to −29° C.) for at least 48 to 72 hours.

The present invention describes an edible topping which includes both milk solids and an oil in water emulsion which is easily whippable at cooling (22±2° C.), ambient and high heat condition (32±2° C.). The edible topping has a smooth and non-greasy texture, non-waxy mouthfeel with a very high heat stability such as at 32-34° C. Whipped cream can be applied to cake within the robust environmental condition.

The quality parameters such as overrun, rosette time, stability time, crack in the cake, and coarse/soft) of the product are determined using conventional methods.

Overrun

Overrun is the term to express the percent expansion of whipping cream achieved from the amount of air incorporated into the product during whipping process. An overrun of 50% means it has expanded 50% (for example: one gallon of mix will make one and a half gallons of finished product). The overrun is measured using the following formula:

$$\text{Overrun } \% = \frac{\text{Liquid Weight in } std.cup}{\text{Whipped Weight in } std.cup} \times 100.$$

Rosette Time

The term rosette indicates a rose shaped decoration and rosette time can be defined as the duration of time, for which the rosettes made from a single piping bag is acceptable.

Bench Time

Bench time again is a measure of stability of whipped cream with respect to texture changes upon storage at given temperature.

Refrigerated Stability

The Stability of whipped cream measured at refrigerated condition (Temp: 4-7° C.). After whipping, transfer the cream to a plastic bowl and store under refrigerated condition for 72 hrs. The quality of the product with respect to texture and firmness is checked after every 24 hrs.

Cake Stability

The stability of whipped creams is checked after applying upon cakes and storing under refrigerated conditions, Temp 4-7° C. Evaluation of cakes is conducted at 24 hours interval for 72 hours of storage.

Decoration Stability

Decoration stability is the measure of the ability of decorations made using any cream to stand without any change or deformation under given temperature conditions. The time taken for the decorations to lose shape may vary for different decorations.

The present disclosure now being generally described, it will be more readily understood by reference to the following examples, which are included merely for purposes of illustration of certain aspects and embodiments of the present disclosure and are not intended to limit the present disclosure in any way.

The ingredient and its supplier are as mentioned below:

| | |
|---|---|
| Local Sugar | Sahoo Sugar (India) |
| Fat 2 | Adani Wilmar (India) |
| Fat 1 | Adani Wilmar (India) |
| Sodium Caseinate | Asaram and Sons. |
| Soya Protein Isolate | Solae India Pvt. Ltd |
| Butter milk powder | Calpro |
| Di-Sodium Orthophosphate | Punjab Chemicals |
| Hydroxypropyl Methyl Cellulose | Shandong Dao (China) |
| Xanthan Gum | Brenntag |
| Tara gum | Ingredion |
| Propylene Glycol Ester | IFF (India) |
| Propylene Glycol Mono-stearate | IFF (India) |
| Distilled mono-glycerides | IFF (India) |
| Sorbitan mono-stearate | Fine organics (India) |
| Crystallizer-10 | Lasenor India |
| Eurovanillin | Spring valley Marketing (India) |
| Polysorbate 80 | Viswat chemicals India |

EXAMPLES

Non-limiting examples of formulations of whipping cream composition of the present invention are provided in the following tables:

Example 1

TABLE 3

| Ingredient | Recipe 1 Percent by weight | Recipe 2 Percent by weight | Recipe 3 Percent by weight |
|---|---|---|---|
| Water | 61.069 | 57.220 | 61.390 |
| Local Sugar | 27.712 | 25.965 | 27.712 |
| Fat 2 | 6.158 | 7.213 | 8.5 |
| Fat 1 | 2.566 | 7.213 | 0 |
| Sodium Caseinate | 0.462 | 0.481 | 0.462 |
| Soya Protein Isolate (SPI) | 0.154 | 0.192 | 0.154 |
| Butter milk powder (BMP) | 0.164 | 0.144 | 0.164 |
| Di-Sodium Orthophosphate | 0.077 | 0.096 | 0.077 |
| Hydroxypropyl Methyl Cellulose | 0.462 | 0.361 | 0.462 |
| Xanthan Gum | 0.057 | 0.072 | 0.057 |
| Tara gum | 0.057 | 0.072 | 0.057 |
| Propylene Glycol Ester | 0.462 | 0.433 | 0.462 |
| Propylene Glycol Mono-stearate | 0.308 | 0.337 | 0.308 |
| Distilled mono-glycerides | 0.077 | 0.000 | 0.077 |
| Sorbitan mono-stearate | 0.035 | 0.072 | 0.035 |
| Crystallizer-10 | 0.051 | 0.048 | 0.051 |
| Eurovanillin | 0.020 | 0.019 | 0.020 |
| Polysorbate 80 | 0.111 | 0.063 | 0.111 |

Example 2

TABLE 4

| Ingredient | On Recipe 1 SPI replaced with BMP Percent by weight | on Recipe 1 BMP replaced with SPI Percent by weight | on Recipe 1 BMP & SPI replaced with Sodium Caseinate Percent by weight |
|---|---|---|---|
| Water | 0 | 61.069 | 61.069 |
| Local Sugar | 27.712 | 27.712 | 27.712 |
| Fat 2 | 6.158 | 6.158 | 6.158 |
| Fat 1 | 2.566 | 2.566 | 2.566 |
| Sodium Caseinate | 0.462 | 0.462 | 0.78 |
| Soya Protein Isolate | 0 | 0.32 | 0 |
| Butter milk powder | 0.32 | 0 | 0 |
| Di-Sodium Orthophosphate | 0.077 | 0.077 | 0.077 |
| Hydroxypropyl Methyl Cellulose | 0.462 | 0.462 | 0.462 |
| Xanthan Gum | 0.057 | 0.057 | 0.057 |
| Tara gum | 0.057 | 0.057 | 0.057 |
| Propylene Glycol Ester | 0.462 | 0.462 | 0.462 |
| Propylene Glycol Mono-stearate | 0.308 | 0.308 | 0.308 |
| Distilled mono-glycerides | 0.077 | 0.077 | 0.077 |
| Sorbitan mono-stearate | 0.035 | 0.035 | 0.035 |
| Crystallizer-10 | 0.051 | 0.051 | 0.051 |
| Eurovanillin | 0.02 | 0.02 | 0.02 |
| Polysorbate 80 | 0.111 | 0.111 | 0.111 |

The overrun, rosette time, stability time, crack in the cake, and coarse/soft were measured as explained above, and are shown in table 5 below.

TABLE 5

| Properties | Recipe 1 | Recipe 2 | Recipe 3 | On Recipe 1 SPI replaced with BMP | on Recipe 1 BMP replaced with SPI | on Recipe 1 BMP & SPI replaced with Sodium Caseinate |
|---|---|---|---|---|---|---|
| Overrun | 421 | 433 | 415 | 425 | 419 | 430 |
| Rosette time (32 ± 2° C.) | 20 | 15 | 15 | 20 | 15 | 15 |
| Stability Time (32 ± 2° C.) | 90 | 60 | 60 | 90 | 45 | 75 |
| Crack in the cake (72 hr) | NO | NO | NO | NO | NO | NO |
| Coarse/soft | Coarse/ Hard | Coarse/ Soft | Coarse/ Soft | Coarse/ Hard | Coarse/ Soft | Coarse/ Hard |
| Appearance | Very Good Shine. Good and Creamy Taste. | Good texture but turned coarse/soft very fast | Texture was creamy and shiny but turned coarse/soft | Very Good Shine. Good and Creamy Taste. | Product is good creamy but little weak in texture, stability is on lower side. | Texture is creamy but stability is lower comparatively |

The invention claimed is:

1. A whipping cream composition comprising:

a combination of fats comprising fat 1 and fat 2, having different fatty acid profile or solid fat content (SFC) or both thereof, wherein fat 1 is present in an amount from 30 wt. % to 50 wt. % of the total fat combination and fat 2 is present in an amount from 50 wt. % to 70 wt. % of the total fat combination;

about 0.45 wt. % to about 0.6 wt. % protein;

sweetener;

stabilizer;

emulsifier; and water.

2. The whipping cream composition as claimed in claim 1, wherein fatty acid profile of fat 1 comprises 3 to 4% C: 10; 46 to 48% C: 12; 14 to 16% C: 14; 8 to 9% C: 16; 22 to 23% C: 18; 0.3 to 0.5% C: 18:1; and 0.1 to 0.3% C: 18:2.

3. The whipping cream composition as claimed in claim 1, wherein fatty acid profile of fat 2 comprises 2 to 4% C: 10; 49 to 53% C: 12; 21 to 23% C: 14; 9 to 11% C: 16; 7 to 9% C: 18; 0.3 to 1% C: 18:1; and 0.2 to 0.5% C: 18:2.

4. The whipping cream composition as claimed in claim 1, wherein SFC of fat 1 is 75 to 80% at 20° C.; 55 to 60% at 25° C.; 28 to 30% at 30° C.; and 6 to 8% at 40° C.

5. The whipping cream composition as claimed in claim 1, wherein SFC of fat 2 is 93 to 97% at 20° C.; 85 to 90% at 25° C.; 42 to 50% at 30° C.; and 0 to 0.5% at 40° C.

6. The whipping cream composition as claimed in claim 1, wherein fat 1 is 30% and fat 2 is 70% of the total fat combination.

7. The whipping cream composition as claimed in claim 1, wherein fat 1 and fat 2 are fully hydrogenated or partially hydrogenated.

8. The whipping cream composition as claimed in claim 1, wherein both fat 1 and fat 2 are fully hydrogenated.

9. The whipping cream composition as claimed in claim 1, wherein both fat 1 and fat 2 have iodine value of less than 2.

10. The whipping cream composition as claimed in claim 1, wherein fat 1 and fat 2 are palm kernel oil.

11. The whipping cream composition as claimed in claim 1, further comprises a crystallizer, a flavoring agent, a salt, a preservative or any combination thereof.

12. The whipping cream composition as claimed in claim 1, wherein the protein is a combination of micellar protein and globular protein.

13. The whipping cream composition as claimed in claim 12, wherein the globular protein is selected from the group comprising milk derived protein, plant protein, beta-lacto-globulin, ovalbumin, bovine serum albumin, and any combination thereof.

14. The whipping cream composition as claimed in claim 12, wherein the micellar protein is micellar casein.

15. The whipping cream composition as claimed in claim 13, wherein the plant protein is soya protein isolate and present in an amount from about 0.05 wt. %. to about 0.20 wt. %.

16. The whipping cream composition as claimed in claim 14, wherein micellar casein is alkali metal caseinate and is present in an amount from about 0.40 wt. % to 0.50 wt. %.

17. The whipping cream composition as claimed in claim 1, wherein sweetener is present in an amount from 25 wt. %. to about 30 wt. %.

18. The whipping cream composition as claimed in claim 1, wherein the stabilizer is selected from a group comprising hydroxypropyl methylcellulose (HPMC), xanthan gum, tara gum, locust bean gum and any combination thereof, and is present in an amount from about 0.30 wt. % to about 0.50 wt. %.

19. The whipping cream composition as claimed in claim 1, wherein the emulsifier is selected from the group comprising polyglycol ester, propylene glycol mono stearate, mono glyceride, sorbitan mono stearate and any combination thereof, and is present in an amount from about 0.5 wt. % to about 1.5 wt. %.

20. The whipping cream composition as claimed in claim 1, wherein the emulsifier is a combination of polyglycol ester, propylene glycol mono stearate, mono glyceride and sorbitan mono stearate.

21. The whipping cream composition as claimed in claim 11, wherein salt is selected from the group comprising phosphate salt, halide salt, citrate salt and any combination thereof, and is present in an amount from about 0.01 wt. %. to about 0.10 wt. %.

22. The whipping cream composition as claimed in claim 11, wherein crystallizer is present in an amount from about 0.03 wt. to about 0.05 wt. %.

* * * * *